March 27, 1956 A. F. HICKMAN 2,739,821
TANDEM AXLE SPRING SUSPENSION
Filed July 10, 1952 7 Sheets-Sheet 1
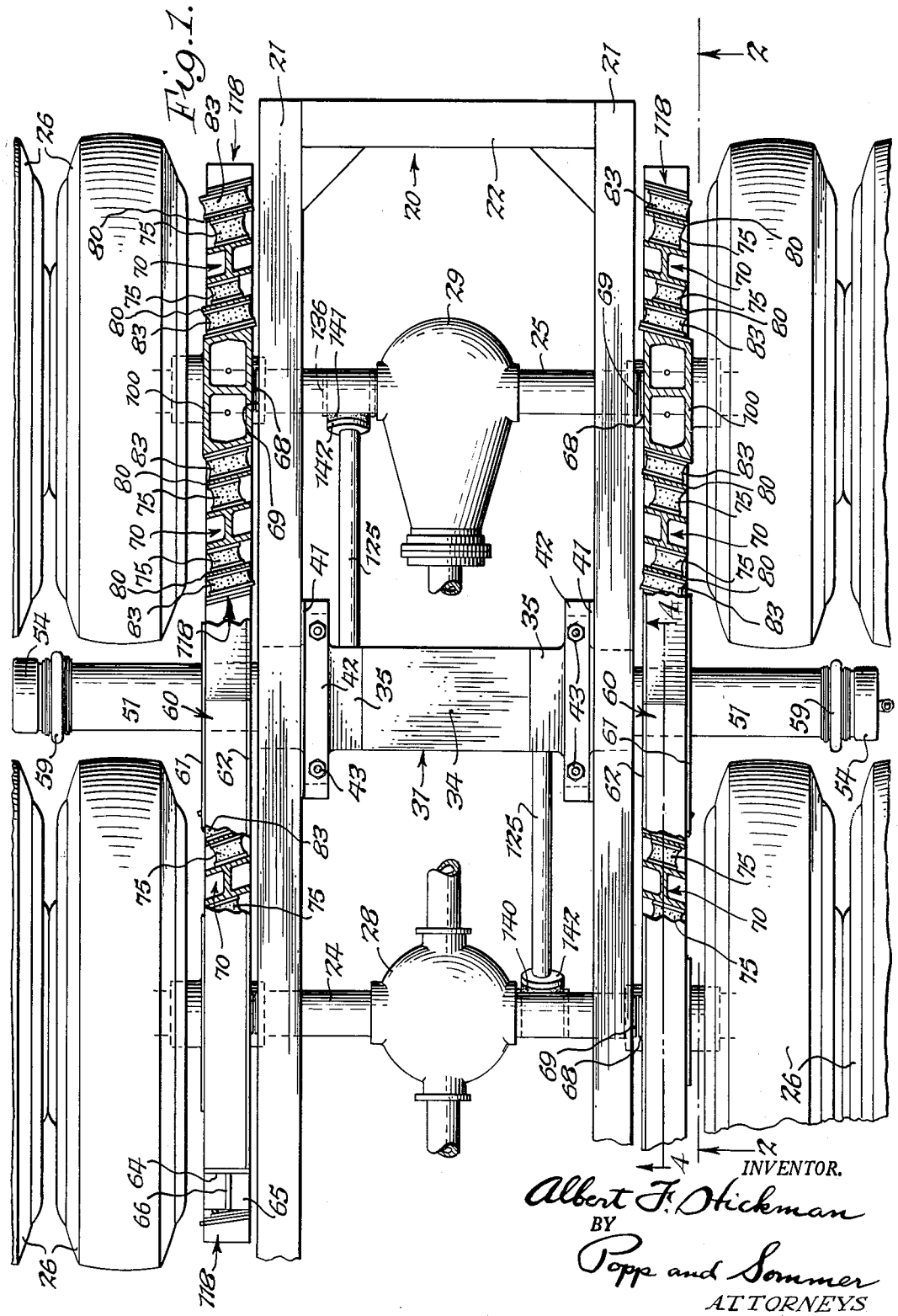
INVENTOR.
Albert F. Hickman
BY
Popp and Sommer
ATTORNEYS

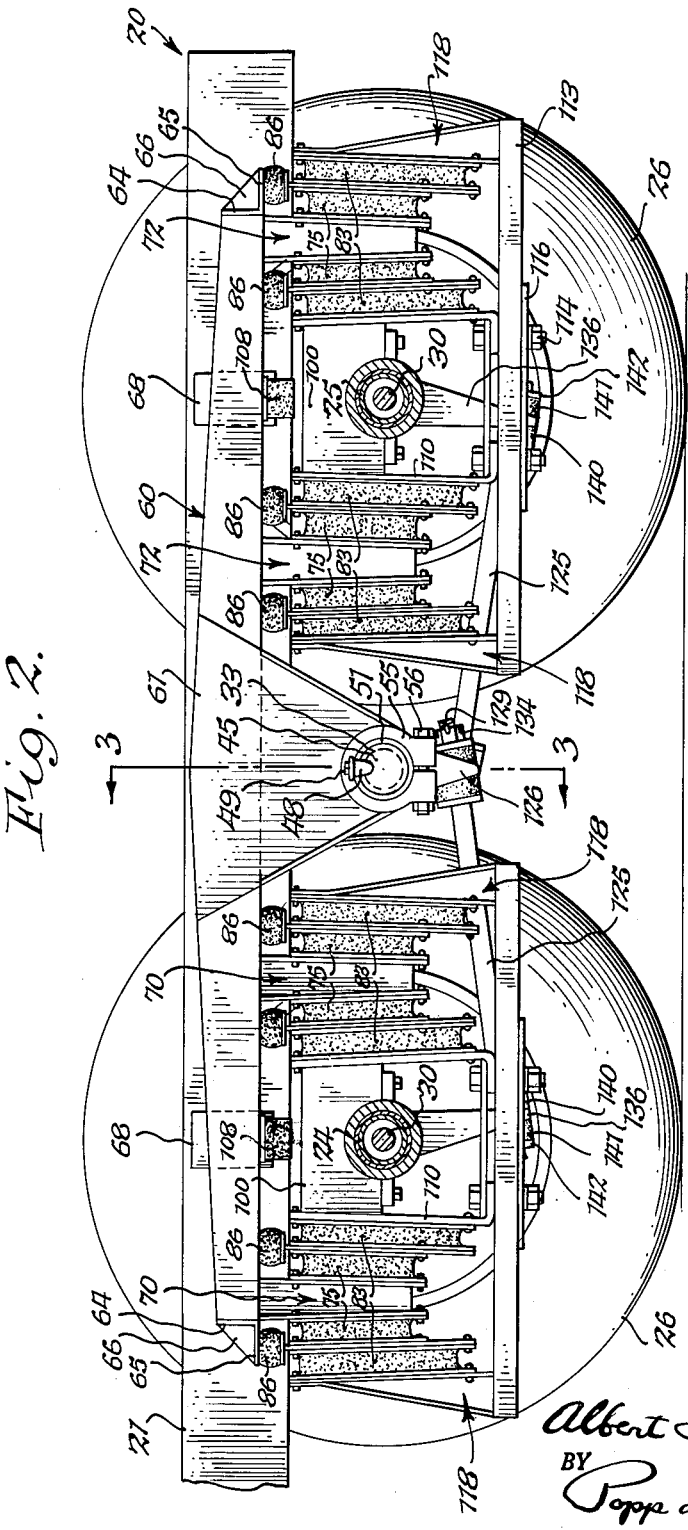

March 27, 1956 A. F. HICKMAN 2,739,821
TANDEM AXLE SPRING SUSPENSION
Filed July 10, 1952 7 Sheets-Sheet 3

INVENTOR.
BY Albert F. Hickman
Popp and Sommer
ATTORNEYS

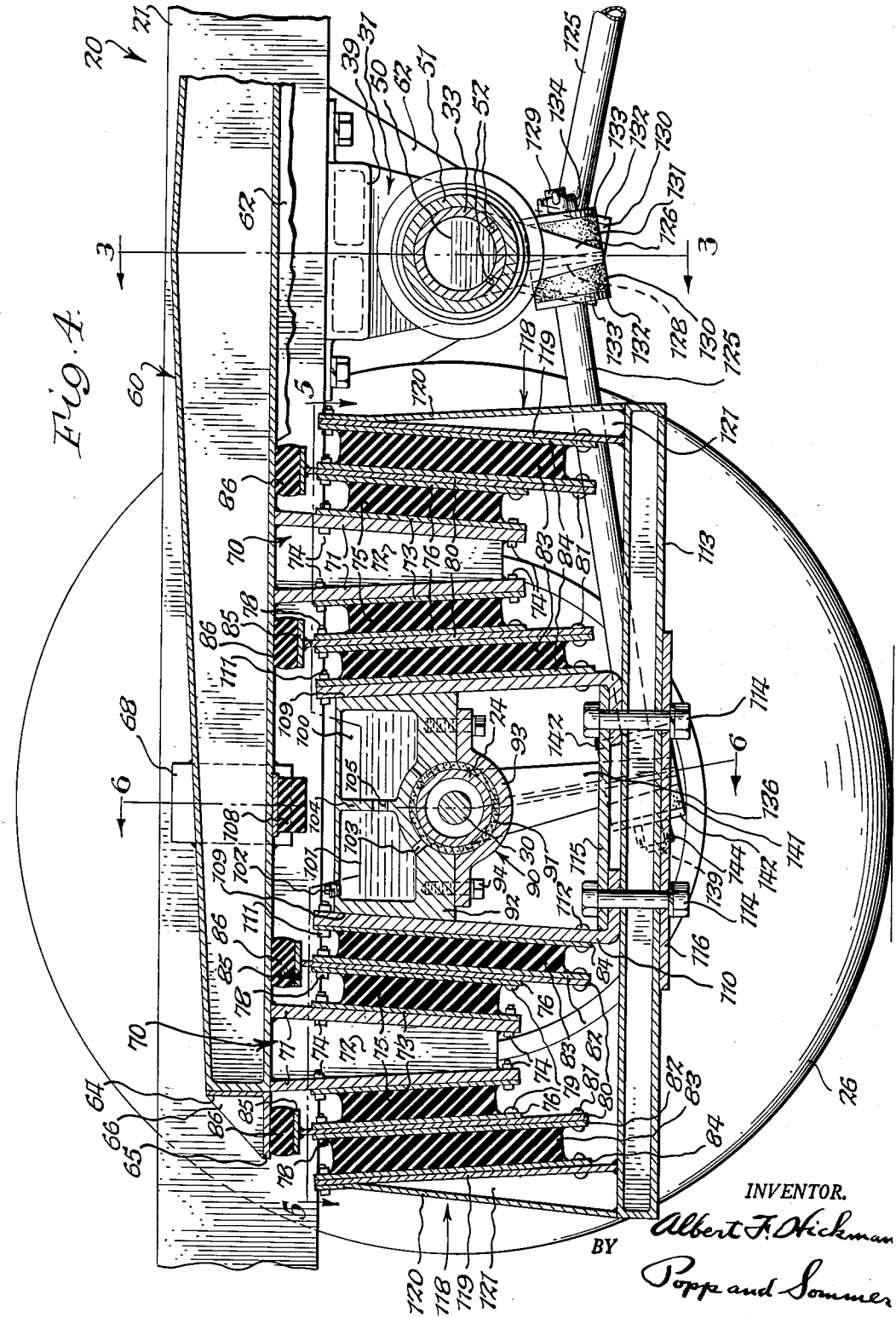

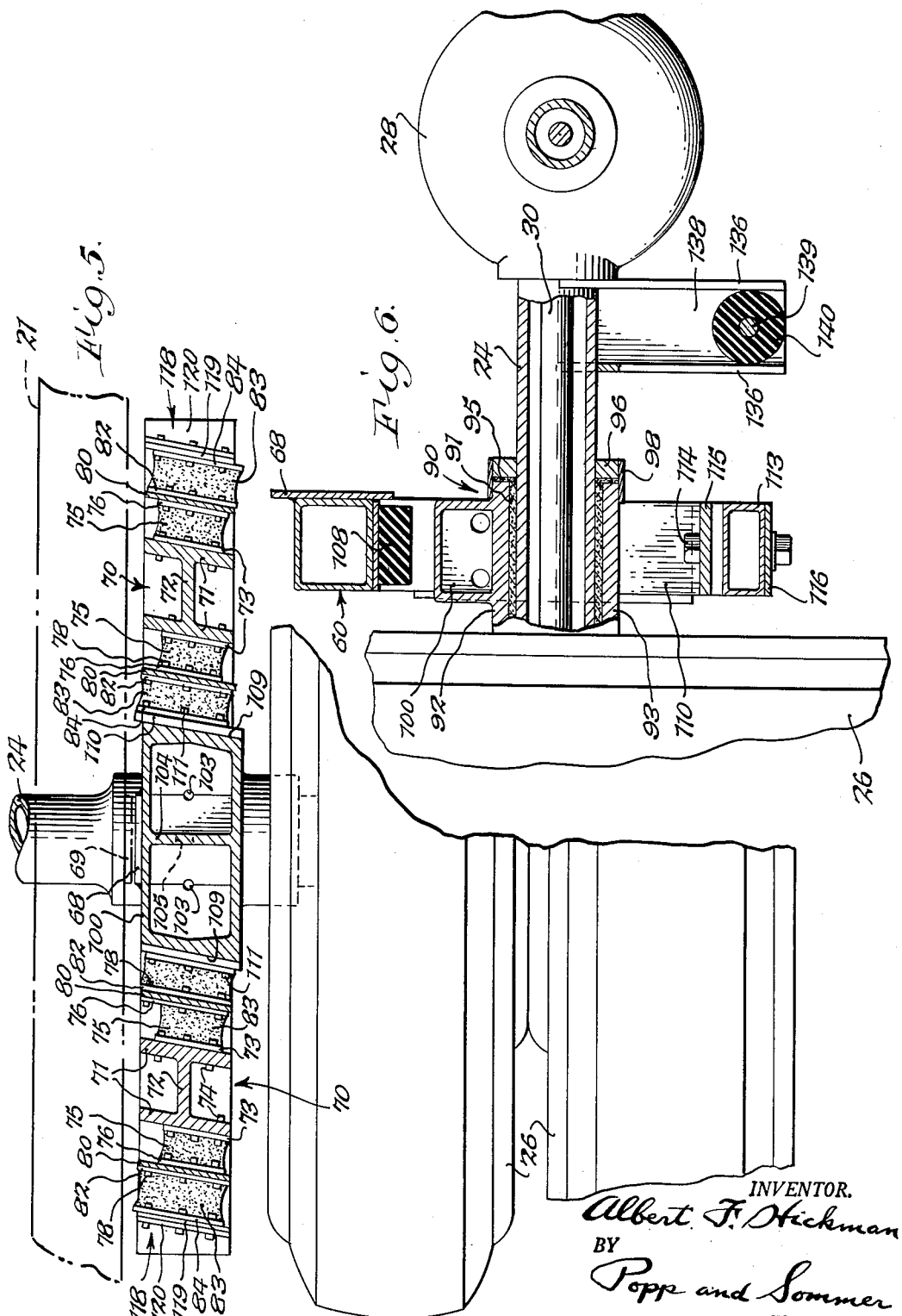

March 27, 1956 — A. F. HICKMAN — 2,739,821
TANDEM AXLE SPRING SUSPENSION
Filed July 10, 1952 — 7 Sheets-Sheet 6
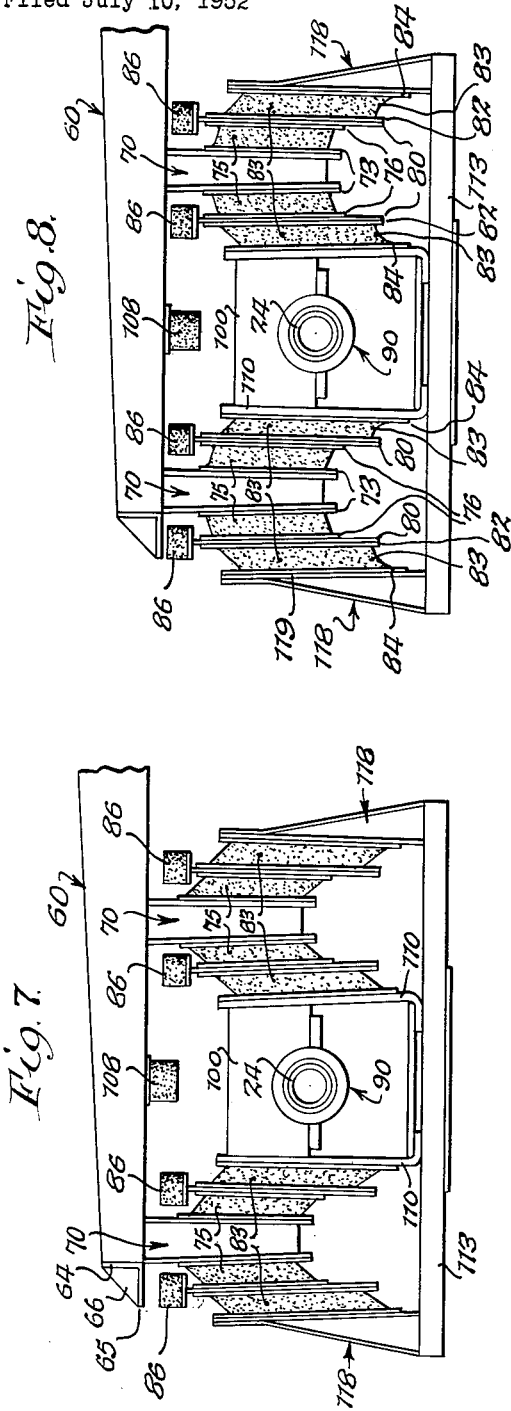
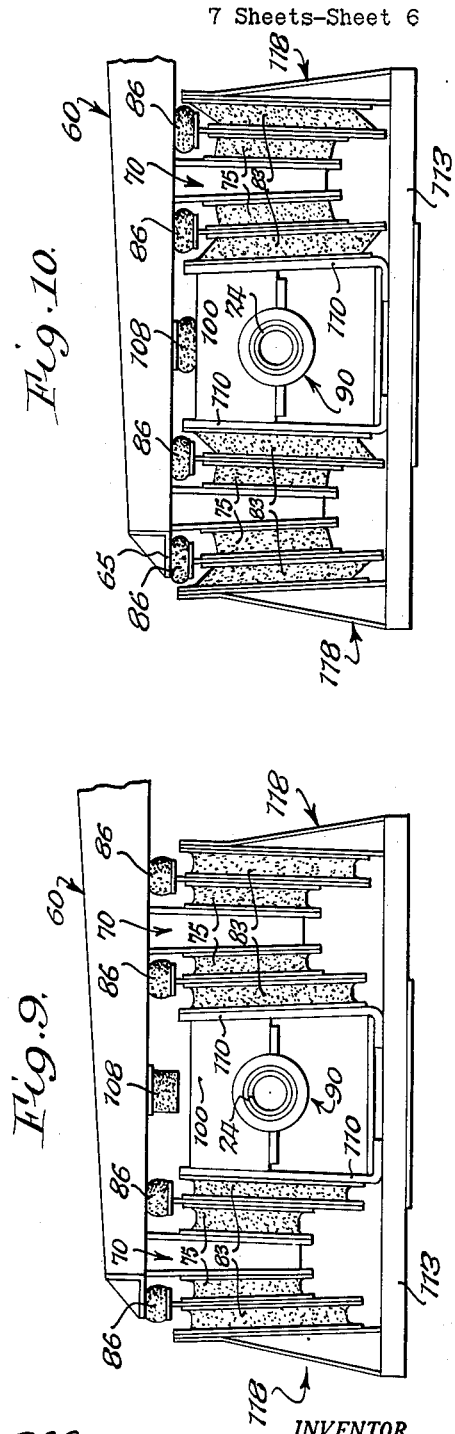
INVENTOR.
Albert F. Hickman
BY
Popp and Sommer
ATTORNEYS March 27, 1956 A. F. HICKMAN 2,739,821
TANDEM AXLE SPRING SUSPENSION
Filed July 10, 1952 7 Sheets-Sheet 7

INVENTOR.
Albert F. Hickman
BY
Popp and Sommer
ATTORNEYS.

United States Patent Office 2,739,821
Patented Mar. 27, 1956

2,739,821

TANDEM AXLE SPRING SUSPENSION

Albert F. Hickman, Eden, N. Y., assignor to Hickman Developments, Inc., Eden, N. Y., a corporation of New York Application July 10, 1952, Serial No. 298,026

16 Claims. (Cl. 280—104.5)

This invention relates to a tandem axle spring suspension for trucks, trailers and passenger buses and more particularly to such a tandem axle suspension in which the resiliency is provided by rubber springs of the shear rubber, rectilinear movement type as shown in my copending application for Spring Suspension for Tandem Axle Trucks, Serial No. 260,462, filed December 7, 1951, now Patent No. 2,663,570, dated December 22, 1953.

In common with my said copending application an important object of the present invention is to provide a shear rubber, rectilinear movement type of suspension which will permit the large amount of vertical axle movement necessary with highway vehicles to provide a vertical ride as soft as load heights will allow and at a low frequency.

Another important object in common with my said copending application is to provide such a suspension which is substantially free from friction but is automatically controlled by an increased resistance to motion in proportion to the amplitude and velocity of vertical frame and wheel movement relative to each other.

Another important object in common with my said copending application is to provide such a suspension in which lateral and vertical movement of the axles, as well as a slight amount of longitudinal movement thereof, with reference to the vehicle frame, are permitted and resiliently resisted, the lateral and vertical resilience being sufficient, both when the vehicle is loaded and unloaded, to absorb lateral thrust of the axle, particularly resulting from one wheel moving up and down, thereby to provide increased safety, tire and gasoline mileage and stability.

Also in common with my said copending application, other important objects are to provide such a suspension which has infrequent lubrication requirement; which will stand up for many years without servicing; which is very light in weight, particularly in unsprung weight; which is substantially free from friction but can be automatically controlled by an increasing resistance to motion in proportion to amplitude and velocity of vertical frame and wheel movements; in which no shock absorber control is required; which is compact; which provides a much wider spring base than with conventional leaf springs; which can be easily taken down and replaced; which is low in both initial cost and upkeep; which renders auxiliary devices for the control of sidesway unnecessary; in which periodic vibration of the suspension is dampened out; which can be designed to have a long and variable spring resistance range; and in which the bond stress of the rubber blocks or bodies used is kept within safe working limits.

An important specific object of the present invention is to provide a gearless compensating means connecting the companion ends of the tandem axles and through which the excess load on either axle is transmitted to the other axle.

Another important object is to provide such a spring suspension which is applicable to vehicles having a wide frame and large tires, it having been found difficult to accommodate suspensions to frames over 30 inches wide with 11 inch tires. The present suspension is applicable to frames 34 inches wide and tires of at least 11 inch size.

Another object is to provide such a suspension which can be considerably simplified, shown as a modification, in which the frame or tires are smaller than the above maximum dimensions.

Another object of the invention is to provide such a tandem axle suspension particularly adapted to heavy duty service, the two forms of the invention shown being designed for heavy duty trucks or trailers.

Another specific object of the present invention is to provide such a suspension consisting of compact units which can be arranged without interference with the movement of the axles with respect to the frame and in which the moving parts are arranged inside and close to the wheels to provide high and wide support for the axles with increased stability.

Another important object of the invention is to provide such a tandem axle suspension in which the tandem axles are self-steering so that when rounding a curve the tandem axles are caused to assume such an angle relative to each other as will enable a pure rolling action to be obtained.

Another important object is to provide such a tandem axle suspension in which the entire suspension, including the axles and wheels, can readily be removed and replaced with a new or factory rebuilt suspension, thereby to avoid the inadequacies of field repair and also avoiding withholding the vehicle from service for any great length of time.

A specific object of the present invention is to provide in a tandem axle suspension a simple non-metal-to-metal bottom stop for each end of each axle.

Another object is to reduce the oscillation of the axles with reference to the suspension so that rubber bearings can be employed therebetween.

Another object is to avoid undesired bond stresses or distortion of the shear rubber springs as a consequence of the torsional load created by the rubber bushings.

Another object is to provide such a tandem axle suspension including a compensating beam in which springs are provided between the end of each axle and the compensating beam. By this means rapid and light shocks are absorbed by the axle springs and are not transmitted to the compensating beam as a force which will rotate the compensating beam. All forces are cushioned before being transmitted to the compensating beam.

Other objects and advantages of the invention will be apparent from the following description and drawings in which:

Fig. 1 is a fragmentary top plan view, with parts broken away, of the rear end of a heavy duty truck frame supported on a tandem axle spring suspension embodying the present invention, the form of the invention shown in Figs. 1–10 being especially applicable to such heavy duty trucks having a wide body and large tires contained within the maximum vehicle width permitted by law and which conditions restrict the space available for a spring suspension between the body and tires to a very small amount.

Fig. 2 is a side elevational view of the suspension, this view being in the form of a vertical section taken on line 2—2, Fig. 1 through the axles to eliminate the wheels.

Fig. 3 is an enlarged vertical transverse section taken generally on line 3—3, Figs. 2 and 4 through the journal bearings or sleeves for the compensating beam.

Fig. 4 is a fragmentary enlarged vertical section taken generally on line 4—4, Fig. 1.

Fig. 5 is a fragmentary horizontal section taken generally on line 5—5, Fig. 4.

Fig. 6 is a fragmentary vertical transverse section taken generally on line 6—6, Fig. 4.

Figures 11, 12:
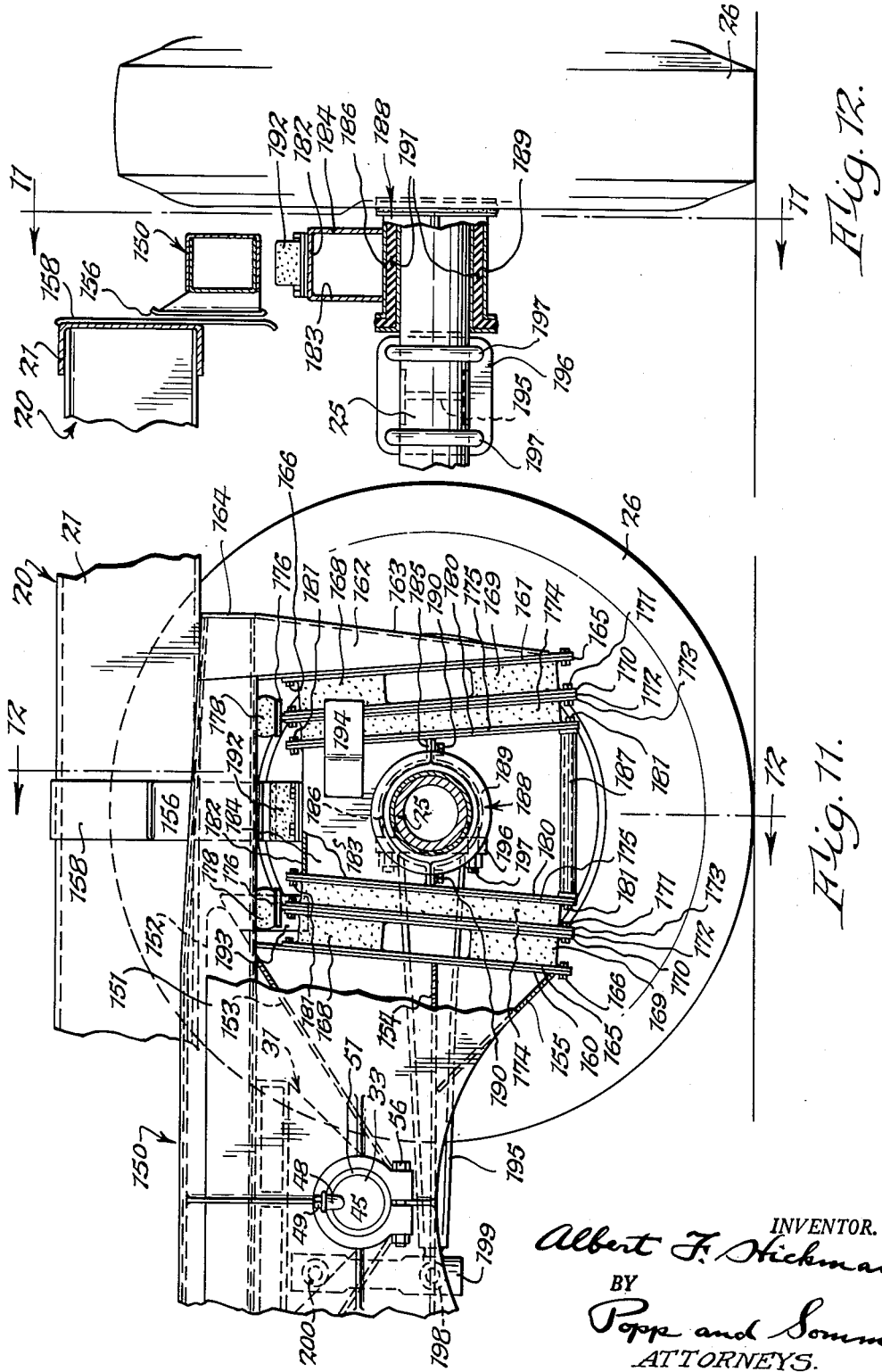

Figs. 7, 8, 9 and 10 are fragmentary simplified or diagrammatic side elevations of the suspension similar to Fig. 2; Fig. 7 showing the no load position of the parts of the suspension such as would occur if the vehicle body were jacked up to relieve the suspension of downward force; Fig. 8 showing the position of the parts supporting only the empty body of the truck and no pay load; Fig. 9 showing the position of the parts when subjected to the maximum static load; and Fig. 10 showing the position of the parts under extreme bottoming forces.

Fig. 11 is an enlarged fragmentary view similar to Fig. 2 and showing a modified form of the invention suitable for trailers or for trucks having narrower bodies and smaller tires than shown in Figs. 1–11 and where more space is available between the body and the tires to accommodate the suspension.

Fig. 12 is a fragmentary vertical section taken generally on line 12—12, Fig. 11.

Figs. 1–10

The form of the suspension shown in Figs. 1–10 is particularly designed for wide bodied, large tired trucks in contradistinction to the form shown in Figs. 11 and 12 which is particularly designed for narrower bodied or smaller tired vehicles, such as trailers, and where more room is available between the tires and body for the suspension.

As to such wide bodied, large tired trucks, present road laws limit the maximum overall width of highway trucks to 96 inches. Heavy duty trucks have a frame width of 34 inches and with 11 inch spaced dual tires, this leaves only from 5 to 6 inches between the tires and each side of the frame to accommodate the suspension and this space must contain enough rubber to support the load and also must accommodate 2 inches of lateral axle movement, that is, one inch of axle movement lengthwise of its axis in either direction. Because of these space limitations and in order to have the necessary total amount or volume of rubber to properly support the vehicle body, in the form of the invention shown in Figs. 1–10 eight rubber shear springs are provided per wheel as compared with the four rubber shear springs per wheel in Figs. 11 and 12 where more space is available and hence where each of the four rubber shear springs per wheel can be made wider and longer than the corresponding individual eight rubber shear springs per wheel so as to individually have a larger effective cross sectional area.

In the form of the invention shown in Figs. 1–10, the main frame 20 of the vehicle can be of any suitable construction and is shown as comprising a pair of longitudinal side frame bars in the form of inwardly facing channels 21, which are shown as straight and parallel and as connected by a cross bar 22 at its rear end. The longitudinal side frame bars can be reinforced, particularly above the tandem axle suspension of the present invention, by reinforcing channels 23 which can be set with their flanges projecting and fitting into the channels of the longitudinal side frame bars 21 as shown in Fig. 3.

The frame is shown as supported by a pair of tandem axles 24 and 25 which are supported by wheels 26, these wheels being rotatably secured on these axles. One or both groups can be drive wheels, both axles being shown as provided for this purpose with differential housings 28, 29 through which power is transmitted to the drive axle shafts 30 housed within the axles 24, 25 and which drive axle shafts are secured to the wheels 26 in the usual and well known manner.

The construction of the tandem axle spring suspension at the left hand side of the truck is substantially the same as the tandem axle spring suspension at the right hand side of the truck and hence a description of the spring suspension at one side of the truck will be deemed to apply to both sides, the same reference numerals being used.

The rear end of the frame 20 is supported on a bolster indicated generally at 31. This bolster can be of any suitable form and is shown as comprising a lower semi-cylindrical saddle 32 fitted over and welded to a cross tube 33, a flat horizontal top plate 34 having upwardly inclined ends 35 and internal webs or ribs 36, 38 connecting the saddle 32 with the ends of the flat horizontal top plate 34 and with the ends of its inclined ends 35, respectively. The bolster 31 is formed to provide elevated ends 39 on the upper flat surfaces of which the longitudinal frame bars 21 rest. The bolster can be secured to each of the longitudinal side frame bars by an angle 40 having a vertical flange 41 welded to the inner face of the reinforcing channel 23 of the longitudinal side frame bar 21 and having a horizontal flange 42 removably secured, as by bolts 43, to the bolster 31.

The bolster is secured to the frame 20 in such position that the cross tube 33 is midway between the tandem axles 24 and 25 and the ends of this cross tube project between the wheels 26 nearest the truck frame. This cross tube, in addition to forming with the bolster 31 the main support for the frame on the tandem axles, also forms an oil reservoir. For this purpose the ends of the cross tube 33 are shown as provided, as best shown in Fig. 3, with welded plugs 45 and 46 and the plug 45 is shown as provided with a pipe L 48 the upstanding outer end of which is plugged, as indicated at 49. Through this pipe L the cross tube 33 can be filled with a body 50 of oil.

This oil is supplied to the internal bearing surface of a rock sleeve 51 journalled on each end of the cross tube. For this purpose the cross tube 33 can be provided with oil holes 52 leading from its interior to the interior bearing surface of the sleeve 51, as best shown in Fig. 4. Each rock sleeve 51 is held against inward displacement by a ring or collar 53 welded to the corresponding end of the cross tube 33 adjacent the bolster 31 and is held against outward displacement by a ring or collar 54 having an outer split clamping section 55 the ends of this clamping section being adapted to be brought into tight embracing relation with the end of the cross tube 33 by a clamping bolt 56.

An oil seal 58 is shown as surrounding the abutting ends of each rock sleeve 51 and collar 53 fixed to the cross tube 33. This oil seal can be of any suitable form but is shown as made of a tube of flexible material with reduced ends bound or otherwise removably secured to the abutting ends of each rock sleeve 51 and collar 53, respectively, and having a radially enlarging central portion which permits rocking movement of the rock sleeve 51 without undue distortion of the flexible seal 58. Similarly an oil seal 59 is shown as surrounding the abutting ends of each rock sleeve 51 and corresponding collar 54 clamped to the cross tube 33. This oil seal can also be of any suitable form but is again shown as being made of a tube of flexible material with reduced ends bound or otherwise removably secured to the abutting ends of each rock sleeve 51 and collar 54, respectively, and having a radially enlarging central portion which permits rocking movement of the rock sleeve 54 without undue distortion of the flexible seal 59. It will be seen that this last oil seal 59 could be substituted by a hub cap for each rock sleeve 51 and by the usual nut and lock nut to prevent outward displacement of the rock sleeve 51 from the cross tube 33.

An elevated compensating beam 60 is fixed to each rock sleeve 51. For this purpose two vertical spaced plates 61 and 62 are welded at their lower ends to each rock sleeve 51 and project upwardly in parallel relation to the longitudinal side frame bars 21 to embrace the compensating beam 60 to which they can be welded. This compensating beam is shown as being of box or rectangular tubular form in cross section and its opposite ends are preferably tapered and extend over the axles 24 and 25 as best shown in Fig. 2. To the ends of each compensating beam an L-shaped extension or bracket 64 is secured and which has a lower flat flange or leg 65 forming a continuation of the under surface of the compensating beam 60 and reinforced by a triangular web 66.

A wear plate 68, shown as being of rectangular form, is secured to each end of each compensating beam 60 on the side thereof opposing the frame 20. Cooperating with these wear plates are wear plates 69 secured to the frame. It will be seen that these wear plates prevent engagement between the compensating beams and the frame under abnormal conditions.

A pair of wedge members 70 project downwardly from each end of each compensating beam 60, these wedge members being fast to the compensating beam and being shown as being identical in construction. The pair of wedge members at each end of the compensating beam 60 are arranged on opposite sides of the corresponding axle 24 or 25 so as to flank the same and project downwardly beyond a horizontal plane intersecting the axle. Each of these wedge members 70 is identical in construction including a pair of plates 71 welded at their upper ends to the underside of the compensating beam 60 to extend transversely of this compensating beam at an oblique angle thereto. The plates 71 of each wedge member 70 converge in a downward direction and between each pair of these plates 71 a vertical strengthening web 72 is interposed as best shown in Fig. 5.

An important feature of the invention, whereby self-steering of the tandem axles is obtained, is that these plates 71 of the wedge members 70 are not parallel with the axle in a horizontal direction but are inclined, as best shown in Figs. 1 and 5. Thus, it will be noted that these plates 71 of the wedge members 70 at each side of the vehicle, while parallel with one another as viewed in Fig. 5, all incline inwardly and toward the rear of the vehicle and it will be noted from Fig. 1 that these plates 71 on the two compensating beams incline in opposite directions, that is, these plates toe out toward the front of the vehicle.

A vertically elongated rectangular metal plate 73 is secured to the external face of each of the plates 71 of each wedge member 70 by horizontal upper and lower series of edge bolts 74, these plates 73 thereby converging downwardly with reference to each other and these plates 73 also, in a horizontal direction, inclining or toeing out toward the front of the vehicle. To the face of each of these rectangular metal plates 73 opposite its wedge member 70 is vulcanized a rubber body 75, these rubber bodies 75 being of relatively small effective cross sectional area, that is, in a direction parallel with the plates 73. The opposite faces of each of these rubber bodies 75 are vulcanized to a vertically elongated rectangular metal plate 76 which is arranged parallel with the plate 73 and which is secured, as by an upper horizontal series of bolts 78 and a lower series of rivets 79 to an intermediate rectangular plate 80. To the opposite face of each intermediate rectangular plate 80 is secured, by the upper row of bolts 78 and a lower horizontal row of rivets 81, the rectangular metal plate 82 of a second rubber body 83 which is vulcanized to this plate 82. Each of the rubber bodies 83 is of substantially larger effective cross sectional area, being larger both vertically and in a direction parallel with the axles, than its companion rubber body 75 as will be noted from an inspection of Figs. 4 and 5. To the face of each rubber body 83 opposite its plate 82 is vulcanized an inner rectangular metal plate 84. At each side of the vehicle the plates 73, 76, 80, 82 and 84 are parallel with each other and with the corresponding plates 71 of the several wedge members 70 as viewed in Fig. 5 and hence it will be seen that each of these plates toe out toward the front of the vehicle.

On the upper end of each of the intermediate plates 80 is welded a horizontal plate 85 which forms a shelf supporting a rubber bumper 86. This rubber bumper is directly under its compensating bar 60 and engages this compensating bar when a predetermined load, preferably the payload, is placed upon the suspension so as to prevent overstressing of the relatively light rubber bodies 75 which have a smaller cross sectional area than the rubber bodies 83. The extreme or end bumpers 86 engage L-shaped extensions 65 of the compensating beam. It will therefore be seen that these light rubber bodies 75 are principally effective when the truck is travelling empty.

As best shown in Figs. 4 and 6, the rubber bodies, as above described, are connected to the axles 24 and 25 by structures which include oscillating bearings indicated generally at 90 on the ends of the axles. Each of these bearings comprises a bearing sleeve 91 fitted on the end of each axle 24 and 25 and preferably made of sintered metal to accept and retain oil internally as well as at the bearing surface. On each bearing sleeve 91 is mounted an upper half bearing bracket 92 and a lower half bearing bracket 93, these half bearing brackets being secured by screws 94 extending through end ears in the lower half bearing bracket 93 and anchored in the upper half bearing bracket as shown in Fig. 4. The parts of these half bearing brackets embracing the axles can be extended to form hubs which, as shown in Fig. 6, can engage thrust bearing disks 95 which can also be of sintered metal. These thrust bearing disks can be backed by rings 96 welded to the axle end and oil seals in the form of flexible rings 98 can be used to seal these thrust bearings.

The upper half bearing bracket 92 is formed to provide a reservoir 100 adapted to be filled and contain a body of oil 101 for supply to the companion sleeve bearing 91 and thrust bearing 95. Each reservoir is filled by removing a filling plug 102, Fig. 4, and the oil is fed through ports 103 to the external surfaces of the sintered metal sleeve bearings 91. The full load is transmitted through these reservoirs 100 and their bearings and they also form the bottoming stops and hence they are of heavy construction and are preferably reinforced by an internal transverse web or partition 104 having a through equalizing port 105. Immediately above this central vertical partition 104 a bottoming rubber bumper 108 is secured in any suitable manner to the underside of the equalizing beam 60. This bottoming bumper is so proportioned as to be compressed to any substantial degree only under extreme loads, as illustrated in Fig. 10, and to prevent overstressing of the other rubber components.

A feature of the invention resides in each of the fore-and-aft faces 109 of the reservoir being of upwardly diminishing wedge form, as shown in Fig. 4 and also so that these faces 109 incline inwardly and rearwardly in a horizontal direction, as shown in Figs. 1 and 5, so that these faces, on opposite sides of the vehicle, toe out toward the front of the vehicle.

An angle bracket 110 is secured, as by welding, to each of the faces 109 of the reservoirs 100 and to each of these angle brackets is secured, as by upper and lower horizontal rows of bolts and rivets 111 and 112, the adjacent rectangular metal plates 84 to which the innermost rubber bodies 83 are vulcanized. The lower ends of these angle brackets 110 for each axle end are in the form of opposing horizontal flanges to which a bar 113 is secured by bolts 114. For lightness each bar is preferably of hollow box form and the heads of the bolts 114, as shown in Fig. 4, bear against a plate 115 on the flanges of the angle brackets 110 and their nuts bear against a backing plate 116 arranged against the underside of the bar 113.

Each end of the bar 113 carries an upwardly diminishing abutment member 118 for the corresponding pair of rubber springs or bodies 83. Each of these abutment members comprises an abutment plate 119, these abutment plates 119, at opposite ends of the bar 113, therefore diverging upwardly, as best shown in Fig. 4, and also inclining inwardly, in a horizontal direction, toward the rear of the vehicles as shown in Figs. 1 and 5. Each abutment plate 119 has a backing plate 120, both being preferably welded to the bar 113, each abutment plate 119 being connected to its backing plate 120 by one or more webs 121.

Radius rods 125 connect each axle 24, 25 with the fixed cross tube 33 to prevent the axle from rotating under drive and brake torque reactions, these radius rods also being arranged to minimize axle rotation or roll resulting from up and down wheel movement. To connect each radius rod 125 with the vehicle frame, two pairs of downwardly projecting, spaced, V-shaped ears 126 are welded to the underside of the fixed cross tube 33 with each pair being arranged adjacent the corresponding bearing sleeve 51 and with each ear extending transversely of the cross tube 33. Between the ears 126 of each pair is welded a cross plate 128 arranged parallel with the cross tube but disposed obliquely to the vertical, each of these cross plates being arranged normally perpendicular to the corresponding radius rod 125 to which it is connected.

For this connection each radius rod 125 has a reduced threaded end 129 extending through the corresponding cross plate 128 and through a pair of rubber bushings 130, 131 which flank the cross plate 128. Each rubber bushing 130 is compressed against its cross plate 128 by a washer 132 held against the shoulder on its radius rod produced by the reduced threaded end 129 and each rubber bushing 131 is compressed against its cross plate 128 by a washer 133 backed by a castellated nut 134 screwed on the reduced threaded end 129 of its radius rod.

The radius rods 125 incline downwardly in opposite directions lengthwise of the vehicle frame and have their opposite ends arranged under a corresponding axle 24 or 25. This opposite end of each radius rod is connected to the corresponding axle in the same manner as its connection with the cross tube 33. Thus each axle 24 and 25 has two pairs of downwardly projecting, spaced, V-shaped ears 136 welded to the outside of the axle with each pair being arranged intermediate the differential housing 28 or 29 and the oscillating bearing 90 and with each ear extending transversely of the axle. Between the ears 136 of each pair is welded a cross plate 138 arranged parallel with its axle but disposed obliquely to the vertical, each of these cross plates being arranged normally perpendicular to the radius rod 125 to which it is connected.

For this connection each radius rod 125 has a reduced threaded end 139 extending through the corresponding cross plate 138 and through a pair of rubber bushings 140, 141 which flank the cross plate 138. Each rubber bushing is compressed against its cross plate by a washer 142 held against the shoulder on its radius rod produced by the reduced threaded end 139 and each rubber bushing 141 is compressed against its cross plate 138 by a castellated nut 144 screwed on the reduced threaded end 139 of its radius rod.

It will be seen that this rubber bushed connection between each end of each radius rod 125 and the cross tube 33 and corresponding axle 24 or 25 provides a resilient universal joint which permits vertical and lateral movements of the axles 24 and 25 and at the same time prevents axle roll or rotation under brake and drive torque reactions since each axle has a lever connected by a radius rod with the frame.

Operation

Referring more particularly to the form of the invention shown in Figs. 1–10, in the operation of the suspension, the upward movement of one end, say, the front tandem axle 24 effects upward movement of the corresponding sintered metal sleeve bearing 91 and its bearing blocks 92 and 93, the former being in the form of the bottom wall reservoir 100 supplying oil 101 through the ports 103 to the bearing sleeve 91 and this oil working through this sintered metal bearing sleeve to the internal bearing surface thereof.

This upward movement of the front axle reservoir 100 is transmitted through the large L-shaped side brackets 110 fast to the opposite sides of this reservoir directly to the plates 84 to which the inner pair of larger shear rubber bodies 83 are severally vulcanized. This upward movement of the L-shaped side brackets 110 is also transmitted to the bar 113 secured to the lower ends of these L-shaped brackets 110 of the front tandem axle. The upward movement of this bar 113 is transmitted to the abutment members 118 rising from its front and rear ends and is transmitted by these end abutment members 118 to the plates 84 to which the outer larger pair of rubber bodies 83 are severally vulcanized.

The inner pair of larger rubber bodies 83 associated with the one end of the front tandem axle 24 transmit this upward movement through the plates 82 vulcanized thereto, and through the intermediate plates 80, to the plates 76 vulcanized to the inner pair of smaller rubber bodies 75. This inner pair of smaller rubber bodies 75 transmit this upward movement through the plates 73 vulcanized thereto to the inner plates 71 of the wedge members 70 depending from the corresponding end of the compensating beam 60.

Similarly the outer pair of larger rubber bodies 83 associated with the one end of the front tandem axle 24 transmit this upward movement through the plates 82 vulcanized thereto, and through the intermediate plates 80, to the plates 76 vulcanized to the outer pair of smaller rubber bodies 76. This outer pair of smaller rubber bodies 75 transmit this upward movement through the plates 73 vulcanized thereto to the outer plates 71 of the wedge members 70 depending from the corresponding end of the compensating beam 60.

Accordingly the forward end of the compensating beam is swung upwardly, this beam swinging on its bearing sleeve 51 journalled on the projecting end of the cross tube 33, this cross tube being fast to the main frame 20 through the bolster 31 as best shown in Fig. 3. This bearing sleeve 51 has its internal bearing surface supplied with oil through ports 52 from the large body 50 of oil contained within the cross tube 33.

Accordingly the upward movement of the front end of the compensating beam 60 effects a downward movement of its rear end to effect axle compensation or load transfer to the rear tandem axle 25. Thus this downward movement of the rear end of this compensating beam 60 is transmitted through the depending wedge members 70 associated with the rear tandem axle 25 to the plates 73, 73 vulcanized to the smaller shear rubber spring 75, 75. The smaller pair of inner shear rubber springs 75, 75 transmit this downward movement to the plates 76, 76 vulcanized thereto and through the intermediate plates 80, 80 to the plates 82, 82 vulcanized to the inner pair of larger shear rubber springs 83, 83. This inner pair of larger shear rubber springs 83, 83 transmit this downward movement through the plates 84, 84 vulcanized thereto directly to the L-shaped axle brackets 110, 110 associated with the rear tandem axle 25.

This downward movement of the L-shaped brackets 110 of the rear tandem axle 25 is transmitted to the sides of the reservoir 100 of this rear tandem axle and which also forms the upper half bearing for the sintered metal bearing sleeve 91 for the rear tandem axle 25 and which is supplied with the oil 101 in this reservoir through the ports 103. The downward movement of the upper half bearing or reservoir 100 accordingly transmits a downward pressure on the rear tandem axle 25 so that the assumed upward force on the corresponding end of the front tandem axle is shared by the rear tandem axle and its wheels 26.

Fig. 7 illustrates the condition of the rubber shear springs when the suspension is unloaded, such as would be the case if the frame 20 were jacked up and Fig. 8 illustrates the condition of these springs when the load of the empty body is placed on the suspension. It will be seen that when traveling empty, the resilient support for the frame is preponderantly provided by the pairs of smaller rubber shear springs 75 and 75 since these have a smaller effective cross sectional area than the pairs of rubber shear springs 83 and 83 and hence flex vertically to a much greater degree as illustrated by a comparison of Figs. 7 and 8. Accordingly when traveling empty the body frame is essentially carried by the pairs of smaller rubber shear springs 75 and which can be proportioned to give the desired low frequency ride to the truck when traveling empty. At this time, that is with an empty body, the rubber bumpers 86 are out of contact with the compensating beam 60 and hence lateral axle movement is cushioned preponderately by the smaller shear rubber springs 75.

When the load is placed upon the body frame 20 these pairs of smaller shear rubber springs are distorted or stressed to a degree which effects engagement between the rubber bumpers 86 at the upper ends of the intermediate plates 82 with the underside of the compensating beam 60. By this engagement of these bumpers 86 further downward forces of the loaded body frame are substantially bypassed by the pairs of lighter shear rubber springs 75, the only further stressing of these light rubber springs being that permitted by the compression of the rubber bumpers 86. Thus, when the body frame is loaded, as illustrated in Fig. 9, the downward force of the load on each compensating beam 60 is transmitted through the rubber bumpers 86 to the intermediate plates 80 of both the front and rear tandem axles 24 and 25. From the intermediate plates 80 this downward force is transmitted through the pairs of heavier shear rubber springs 83 directly to the L-shaped brackets 110 and reservoirs 100 forming the upper half bearings for the two tandem axles. From the intermediate plates 80 this downward force is also transmitted through the pairs of heavier shear rubber springs 83 to the end abutments 118 rising from the bars 113 and these bars transmit this force to the L-shaped brackets 110 of the reservoirs 100 forming the upper half bearings on both the front and rear tandem axles 24 and 25. The total effective cross sectional area of the heavier shear rubber springs 83 is designed to provide the desired low frequency ride when the truck is loaded. Also these heavier shear rubber springs 83 in conjunction with the rubber bumper 86 now provide the cushioning for the lateral axle movement.

It will be seen that the rubber bumpers 86 in addition to providing the desired ride frequency by cutting the lighter shear rubber springs 75 effectively out of service when the truck is loaded also prevent overstressing of these lighter shear rubber springs, particularly overstressing of the bond between these lighter rubber bodies and the plates to which they are vulcanized.

Under severe shock forces the pairs of heavier shear rubber springs 83 are also prevented from being overstressed, particularly at their bond with the plates to which they are vulcanized. Thus with bottoming forces the rubber bumpers 108 on the compensating beam 60 engage the tops of the oil reservoirs 100 as illustrated in Fig. 10. When this engagement occurs further downward forces of the frame 20 are essentially transmitted from the compensating beams 60 through these rubber bumpers 108 directly to the oil reservoirs 100 which form the upper half axle bearings. Accordingly it will be seen that these bottoming forces essentially by-pass all of the shear rubber springs 75 and 83, the only stressing, following engagement of these rubber bumpers 108, of the heavier shear rubber springs 83 being that permitted by the compression of these rubber bumpers 108. Accordingly overstressing of the shear rubber springs is effectively prevented.

The form of the invention shown in Figs. 1–10 is particularly designed as the tandem axle suspension of the rear end of a wide bodied, large tired truck, especially a truck having a wide frame, such as a 34 inch wide frame, and large tires, such as 11 inch tires, and the frame and tires having a 96 inch overall dimension, which is the usual maximum overall dimension permitted by law. With such maximum overall dimension and with such large sized frame and tires the room between the tires and the frame, and in which the suspension must be accommodated, is very limited, being only from 5 to 6 inches. In this space of 5 to 6 inches, with a shear rubber spring, it is necessary to put enough rubber to carry the load and it is also necessary additionally to allow 2 inches of lateral movement of each axle, that is, an inch in each direction. Because of such conditions imposed on the design of a wide frame large tire truck it is necessary to reduce the size of the shear rubber bodies in a direction lengthwise of the axle to values which will fit within the 5 or 6 inch space between the frame and tires. With such reduction of the size of these shear rubber bodies, and with limitations imposed on their vertical dimensions, it was found that the number of shear rubber bodies used had to be increased in order to function properly in carrying the heavy loads imposed on trucks and also provide the vertical axle movement required for the desired low frequency ride characteristics. Thus, comparing the form of the invention shown in Figs. 1–10, designed for wide frame, large tired trucks, with the form of the invention shown in Figs. 11 and 12, designed for narrower frame, smaller tired trucks or trailers, it will be noted that the former tandem axle suspension is supported on eight shear rubber bodies at each side of the body whereas the latter is supported on only four. However, the four rubber bodies of the latter, for the same load capacity, have the greater horizontal dimensions parallel with the axle as is permitted by the narrower body and smaller tires.

It will also be noted from Fig. 2 that if any wheel encounters a bump the corresponding axle will move upwardly. If the bump is not very large and it is encountered at high speed very little movement of the compensating beam 60 will occur, this being unique to the present suspension. The shock delivered to one wheel has to go through the springs for that wheel before it can move the compensating beam. All forces, therefore, delivered to the compensating beam are precushioned by the axle springs. This movement of the axles independently of the compensating beam is straight up.

A most important feature of the invention is in self-steering of the both tandem axles. This self-steering is obtained through the angularity, in a horizontal direction, of the shear rubber bodies 75 and 83. Thus, as best shown in Figs. 1 and 5, each of these rubber bodies toe out toward the front of the vehicle, these bodies at each side of the vehicle being parallel.

When the vehicle makes a turn in the road, the tires of each of the axles 24, 25 tend to resist the scuffing which would otherwise occur and in doing so push each axle laterally of the frame to eliminate this scuffing. Confining our attention to, say, the front axle 24, this lateral or axial movement on making a turn displaces the shear rubber bodies 75 and 83 horizontally, these bodies at one side of the vehicle being displaced horizontally toward the frame 20 and at the other side of the vehicle being displaced away from the frame 20. Since these shear rubber bodies are held between plates set at an angle in a horizontal direction and since these plates at opposite sides of the vehicle are set at opposite angles in a horizontal direction so that all of these plates toe out toward the front of the vehicle, it will be seen that such lateral movement of the assumed front tandem axle 24 causes one of its ends to be displaced forwardly and its other end to be displaced rearwardly.

It will therefore be seen that such endwise displacement of each tandem axle will cause a corresponding opposite displacement, fore-and-aft of the frame, of the opposite ends thereof. This fore-and-aft displacement of the two tandem axles 24 and 25 is such that in rounding a curve and with such endwise displacement of the axles 24 and 25 to avoid tire scuffing, both of the tandem axles are caused to steer in the direction to correspond to the turn being made by the vehicle. Thus, when the vehicle is steered to the right, the front end of the body moves about a theoretical vertical pivot intermediate the tandem axles. This causes a lateral movement of the body in opposite directions relative to the two tandem axles, the body moving to the right relative to the front tandem axle 24 and to the left relative to the rear tandem axle 25. This causes the left end of the front tandem axle to move forwardly and the right end of the front tandem axle to move rearwardly. This also causes the left end of the rear tandem axle 25 to move rearwardly and the right end of the rear tandem axle to move forwardly. This movement therefore tends to bring the axes of the tandem axles 24, 25 to intersect the axes of the front steering wheels (not shown) and thereby enable the truck to make the turn without tire scuffing. Equally important is that the self-steering feature tends to hold the wheels in perfect rolling alinement when travelling straight ahead. Particularly it will also be seen that this self-steering action takes place to some extent when a tendency to tire scuffing occurs because of one wheel or a pair of wheels having a diameter different from the diameter of the wheel or pair of wheels at the other end of the same axle.

Another feature of the invention resides in the disposition of the radius rods 125. If the ends of the radius rods under the cross tube 33 had been each lowered a distance from the axis of this cross tube a distance equal to the distance between the axle center and the other end of the radius rod, there would be parallelogram control of the axle which might be desirable for a drive axle but which would result in a greater degree of oscillation of the axles in the bearings 90. If the adjacent ends of the radius rods 125 pivoted about the center of the cross tube 33, the only oscillation of the axles in their bearings 90 would be when one wheel of one axle went up and the other wheel of this axle did not. The pivots for the radius rods 125 under the cross tube 33 are shown as being about half way between these two positions, that is, half way between the axis of the cross tube 33 and that position which would result in a parallelogram action.

While a rubber bushing could be used in lieu of the lubricated bearing surfaces between the cross tube 33 and each of the bearing sleeves 51, such would be cumbersome and expensive as compared with the bearing shown, especially as the cross tube 33 provides a large reservoir for the body of lubricant 50.

*Figs. 11 and 12*

More particularly describing the modified form of the invention shown in Figs. 11 and 12, the frame 20, bolster structure 31, and cross tube 33 are shown as identical with the form of the invention shown in Figs. 1–10 and hence this description is not repeated. Similarly the bearing sleeves for the compensating beam and the lubricant supply for these bearing sleeves are shown as identical to the form of the invention shown in Figs. 1–10 and hence this description is not repeated and the same reference numerals have been used. Also the modified form of the invention shown in Figs. 11 and 12 is shown in conjunction with tubular front and rear tandem axles 24 and 25 carried by wheels 26 as with the form of the invention shown in Figs. 1–10.

The distinguishing features of the form of the invention shown in Figs. 11 and 12 lie in the form of the compensating beam and its mounting on the bearing sleeves 51; the number, form and arrangement of the rubber shear springs or bodies; the form of oscillating bearings at the axle ends; and the form and arrangement of the torque arms.

Thus each compensating beam 150 is of box or rectangular tubular form in cross section and is fixed to the corresponding rock sleeve 51. For this purpose two vertical spaced plates 151 and 152 are welded at their lower ends to each rock sleeve 51 and project upwardly in parallel relation to the longitudinal side frame bars 21 to embrace the compensating beam 150 to which they can be welded. These spaced plates 151, 152 can be internally reinforced and cross connected by cross bars or strips 153, 154 and 155 welded thereto.

As with the form of the invention shown in Figs. 1–10, a wear plate 156 is secured to each end of the compensating beam 150 on the side opposing the frame 20. Cooperating with these wear plates are wear plates 158 secured to the frame. It will be seen that these wear plates prevent engagement between the compensating beams and the frame under abnormal conditions.

The front and rear plates 151, 152 of the compensating beam 150 terminate in end edges to each pair of which end edges is welded an abutment plate 160, each abutment plate 160 being also preferably welded at its upper end to the compensating beam 150 and the internal cross ribs or bars 153, 154 and 155 of the side plates of the compensating beam.

As with the form of the invention shown in Figs. 1–10, the abutment plates 160 for each compensating beam not only converge downwardly but also toe out in a horizontal direction toward the front of the vehicle to provide self-steering of the tandem axles.

Opposing each of the abutment plates 160 of each compensating beam is a counterpart abutment plate 161, the two abutment plates 161 for each compensating beam diverging downwardly and being arranged to toe out in a horizontal direction toward the front of the vehicle to provide self-steering of the tandem axles. Each abutment plate 161 is backed by V-shaped depending side plates 162 at the opposite ends of each compensating beam and the vertical channel structures thus formed are enclosed by end plates 163 and 164.

A vertically elongated rectangular metal plate 165 is secured to the external face of each of the abutment plates 160, 161 by horizontal upper and lower series of edge bolts 166, these pairs of plates thereby converging upwardly with reference to each other and these plates also, in a horizontal direction, inclining or toeing out toward the front of the vehicle. To the face of each of these rectangular metal plates 165 opposite its abutment plate 160 or 161 are vulcanized an upper rubber body 168 and a lower rubber body 169, these rubber bodies being rectangular in cross section parallel with the axles and being spaced from each other a distance at least equal to their individual height. The opposite faces of each vertical pair of these rubber bodies 168, 169 are vulcanized to a vertically elongated rectangular metal plate 170 each of which is arranged parallel with its companion plate 165 and which is secured, as by an upper and lower horizontal series of edge bolts 171, to a rectangular intermediate plate 172. To the opposite face of each rectangular intermediate plate is secured, by the upper and lower horizontal series of edge bolts 171, the rectangular metal plate 173 of a second rubber body 174 which is vulcanized to this plate 173. Each of these rubber bodies 174 is of substantially greater effective cross sectional area than the com-combined effective cross sectional areas of the companion pair of rubber bodies 168 and 169. To the face of each rubber body 174 opposite its plate 173 is vulcanized an inner rectangular metal plate 175. At each side of the vehicle the plates 161, 165, 170, 172, 173 and 175 toe out toward the front of the vehicle.

On the upper end of each of the intermediate plates 172 is welded a horizontal plate 176 which forms a horizontal shelf supporting a rubber bumper 178. This rubber bumper is directly under its compensating bar 150 and engages this compensating bar when a predetermined load, preferably the payload, is placed upon the suspension so as to prevent overstressing of the relatively light rubber bodies 168, 169 which have a smaller cross sectional area than the rubber bodies 174. It will therefore be seen that the light rubber bodies 168, 169 are principally effective when the truck is travelling empty.

The rubber bodies as above described are connected to the axles 24 and 25 by structures each of which includes a pair of upwardly converging side plates 180 to the outer faces of which the plates 175 are severally secured as by an upper row of bolts 181, these plates thereby toeing in toward the front of the vehicle. The upper parts of each pair of these side plates 180 are connected by a metal box structure comprising a top wall 182, side walls 183, 184 and a bottom wall 185, all of these walls being welded at their ends to the companion side plates 180 to provide an integral welded structure.

Each bottom wall 185 is arched upwardly at its center to form an upper half bearing 186 for a rubber bushed bearing indicated generally at 188. The lower half bearing 189 is in the form of a semicircular strap having end ears secured by bolts 190 to the bottom wall 185. The half bearings 186, 189 embrace a longitudinally split rubber sleeve 191 and clamp it to a sleeve which is in turn welded to the corresponding axle 24 or 25.

To prevent overstressing of the rubber bodies 168, 169 and 174 a rubber bumper 192 is provided on the top wall 184 of the axle structure, this rubber bumper bottoming against the compensating beam 150 under extreme downward forces from the frame or extreme upward forces from the axles. It will be noted that such extreme forces are not transmitted through the shear springs 168, 169 and 174.

Lateral movement of one center plate 172 at each end of each axle and relative to the compensating beam 150 can be limited by a depending stop bracket 193 secured to the face of the corresponding compensating beam 150 opposing the vehicle frame and arranged in line with the corresponding intermediate plate 172. Lateral movement of one center plate 172 at each end of each axle and relative to the corresponding axle 24 or 25 can be limited by a horizontal stop bracket 194 secured to the outer wall 183 of the axle structure and projecting horizontally into line with the corresponding intermediate plate 192.

Torque arms 195 connect each axle 24, 25 with the vehicle frame 20 to prevent the axle from rotating under drive and brake torque reactions, these torque arms also being arranged to minimize rotation or roll resulting from up and down wheel movement. These torque arms are shown as each having its rear end 196 fitted against one side of its axle and secured thereto by U-bolts 197. The forward end of each torque arm is connected through a ball joint 198 with the lower end of a link 199, the upper end of which is connected by a ball joint 200 with the vehicle frame 20.

It will be seen that the torque arms 195 permit vertical and lateral movements of the axles 24 and 25 and at the same time prevent axle roll or rotation under brake and drive torque reactions since each axle has a link and torque arm connection with the frame.

*Operation of Figs. 11 and 12*

It will be seen that the operation of the form of the invention shown in Figs. 11 and 12 is essentially the same as that described with reference to Figs. 1–10, each axle end being supported by two less shear springs, this being permitted because the narrower body and smaller tires, for which the suspension shown in Figs. 11 and 12 was designed, permits the use of wider and fewer shear springs.

It will be noted, however, that the oscillating bearings for the axles are in the form of the rubber bushings 191 which flex to permit angular movement of the axles to a maximum of about 16 degrees, with a normal oscillation not exceeding 2 or 3 degrees. This small angular movement is obtained through the unique arrangement of the torque arms 195 with their ball joints 199 approximately at axle level and connected by the links 198 to the frame.

The rubber bushings 191, however, pose a problem in that they result in as much as 4000 inch pounds of torque per degree of angular oscillation of each axle, each rubber bushing 191 to a substantial degree acting as a torsion spring. This required the special design of shear springs shown in which it will particularly be noted that the light springs 168, 169 for each axle are four separate bodies arranged in pairs spaced one above the axle and with a line through the center of one body and the diagonally opposite body intersecting the axis of the axle and its rubber bushing 191. This line represents the effective torque reaction of the rubber bodies 168, 169 and regarding this line as a lever arm, it will be seen that the rubber springs 168, 169 resist the torque imposed by the rubber bushings 191 through a relatively long lever arm set at a favorable angle so that the forces created by the rubber bushings 191 are reduced and received as compressive forces by the light rubber bodies 168, 169. Brake and drive torque reactions do not enter into this consideration as they are transmitted through the torque arms 195 and received by the shear rubber bodies in shear and compression, mostly compression. If the separated rubber bodies 168 and 169 were brought together in the form of a shorter one-piece rubber body, as in Figs. 1–10, the torsional load created by the rubber bushing 191 would result in a vertical movement of the light rubber shear springs to a point resulting in a cocking action adversely affecting the bond between the shear rubber bodies and their plates and result in distortion. By dividing the shear rubber bodies into the two parts 168 and 169 the torsional load created by the rubber body 191 becomes a compressive force instead of a shear force on the rubber shear springs 168, 169 and under compression these rubber springs are very rigid and capable of taking heavy forces.

From the foregoing it will be seen that the present invention provides a shear rubber tandem axle suspension achieving all of the objects and having all of the advantages heretofore enumerated. It will particularly be noted that both forms of the suspension have lateral cushioning or resiliency and automatic steering and that in addition very light and soft springs are called into action when the load is light and heavy springs are called into action when a heavy load is applied.

It will be noted that the compression tubes 187 hold the lower ends of the plates 180 apart under the forces imposed by the inward wedging pressure of the several shear rubber bodies against these plates. At the same time, these compression tubes 187 can be readily removed, by removing the screws 181 if for any reason it becomes necessary to drop the axle.

By "rubber" as used in the accompanying claims is meant both natural rubber and also synthetic rubber and mixtures of natural and synthetic rubber.

I claim:

1. A tandem axle vehicle spring suspension adapted to be interposed between a vehicle frame and a pair of tandem axles each having wheels journalled on the ends thereof, comprising a compensating beam at one side of said frame and pivotally connected near its center to said frame intermediate said axles and to oscillate about an axis generally parallel with said axles, a pair of shear rubber springs associated with each of said axles and each including a relatively thin rubber body having broad, generally parallel, opposite faces and a metal plate vulcanized to each of said broad faces, and each pair of said shear rubber springs being arranged on opposite sides of the end of its axle with said plates vertically disposed and arranged transversely of said compensating beam, means securing the inner plates of each shear rubber spring to the corresponding axle, and means securing the outer plates of each pair to said compensating beam.

2. A structure as set forth in claim 1 wherein a bumper is interposed between said end of each axle and said compensating beam to limit the maximum upward stress that can be applied to said shear rubber springs.

3. A structure as set forth in claim 1 wherein said plates are angularly disposed in a horizontal direction with reference to the axes of said axles whereby lateral movement of each axle is translated into a movement lengthwise of the frame of said end of each axle.

4. A structure as set forth in claim 1 wherein said shear rubber springs and said ends of said axles are arranged below said compensating beam, and wherein said plates of said shear rubber springs at each end of said compensating beam are arranged to converge upwardly whereby upward movement of said ends of said axles exerts a wedging action on said rubber bodies.

5. A structure as set forth in claim 1 wherein said means securing the inner plates of each shear rubber spring to the corresponding axle includes a structure including an oscillating bearing journalled on the axle end and vertical sides arranged transversely of said compensating beam and to which sides said inner plates are secured, and wherein said sides and plates converge upwardly whereby upward movement of said ends of said axles exerts a wedging action on said rubber bodies, and wherein said sides and plates are angularly disposed in a horizontal direction with reference to the axes of said axles whereby lateral movement of each axle is translated into a movement lengthwise of the frame of said end of each axle.

6. A structure as set forth in claim 1 wherein said shear rubber springs and said ends of said axles are arranged below said compensating beam and wherein said means securing said outer plates of each pair to said compensating beam comprises a pair of abutment members severally fixed to and depending from each end of said compensating beam on opposite sides of said end of a corresponding axle.

7. A structure as set forth in claim 1 wherein an additional pair of shear rubber bodies are associated with each of said axles and each including a relatively thin rubber body having broad, generally parallel, opposite faces and a metal plate vulcanized to each of said broad faces, wherein a horizontal bar is secured to said end of each axle below and parallel with said compensating beam and below said first pair of shear rubber springs, wherein an abutment member is fixed to and rises from each end of each of said bars and is secured to the outer plates of said second pair of shear rubber bodies, and wherein said means securing said outer plates of said first pair of shear rubber springs to said compensating beam comprises an abutment member fixed to and depending from each end of said compensating beam and each fixed to and interposed between the corresponding outer plate of said first pair of shear rubber springs and the corresponding inner plate of said second pair of shear rubber springs.

8. A tandem axle vehicle spring suspension adapted to be interposed between a vehicle frame and a pair of tandem axles each having wheels journalled on the ends thereof, comprising a compensating beam at one side of said frame and pivotally connected near its center to said frame intermediate said axles and to oscillate about an axis generally parallel with said axles, a shear rubber spring at each side of each axle, each of said shear rubber springs including a pair of rubber bodies each having broad, generally parallel, opposite faces and an intermediate metal plate secured to the opposing broad faces of said pair of rubber bodies, means securing the other broad face of one rubber body of each shear rubber spring to the corresponding axle, means securing the other broad face of the other rubber body of each shear rubber spring to said compensating beam, and a rubber bumper limiting the upward movement of each of said intermediate plates relative to said compensating beam.

9. A structure as set forth in claim 8 wherein stops are provided for limiting the movement in the direction of the axis of each axle of at least one of the intermediate plates associated with said axle and with reference to said compensating beam.

10. A structure as set forth in claim 8 wherein stops are provided for limiting the movement with reference to its axle and in the direction of the axis of its axle of at least one of the intermediate plates associated with said axle.

11. A structure as set forth in claim 1 wherein said means securing the inner plates of each pair to the corresponding axle includes an oscillating bearing having a rubber bushing surrounding the axle and flexed torsionally by the oscillation of the axle, wherein a torque arm is fast to each axle, and wherein a vertical link connects the free end of each torque arm with said frame.

12. A tandem axle vehicle spring suspension adapted to be interposed between a vehicle frame and a pair of tandem axles each having wheels journalled on the ends thereof, comprising a compensating beam at one side of said frame and pivotally connected near its center to said frame intermediate said axles and to oscillate about an axis generally parallel with said axles, a shear rubber spring at each side of each axle, each of said springs including a large rubber body arranged adjacent the companion axle and having broad generally parallel opposite vertical faces one of which opposes the companion axle, an intermediate plate secured to the other broad face of each large rubber body, and a pair of upper and lower small rubber bodies secured in vertically spaced relation to the face of each plate opposite the companion large rubber body, each small rubber body of each axle end being diagonally in line with the axle and with a small rubber body on the opposite side of the axle, an axle structure including an oscillating bearing having a rubber bushing surrounding each axle and flexed torsionally as said axle oscillates about its axis, means securing each of said axle structures to the companion pair of said large rubber bodies, and means securing said upper and lower small rubber bodies to said compensating beam.

13. A tandem axle vehicle spring suspension adapted to be interposed between a vehicle frame and a pair of tandem axles each having wheels journalled on the ends thereof, comprising a compensating beam at one side of said frame and pivotally connected near its center to said frame intermediate said axles and to oscillate about an axis which is fixed with reference to said frame and which is generally parallel with said axles, a spring associated with each of said axles and capable of a high degree of vertical flexure and a high degree of horizontal flexure parallel with said axles and each spring including a relatively thin rubber body having broad, generally parallel, opposite faces and a metal plate vulcanized to each of said broad faces, and each of said springs being arranged with said plates vertically disposed and arranged transversely of said compensating beam and at a corresponding end thereof, means securing one plate of each spring to the corresponding axle, and means securing the other plate of each spring to the corresponding end of said compensating beam said springs constituting substantially the entire resilient resistance between said axles and vehicle frame.

14. A tandem axle vehicle spring suspension as set forth in claim 13 wherein the pivotal connection between said compensating beam and frame includes a horizontal tube fixedly secured to said frame to have its opposite ends projecting laterally from said frame and wherein said pivotal connection also includes a bearing sleeve fast to said compensating beam and journalled on the corresponding projecting end of said tube.

15. A tandem axle vehicle spring suspension as set forth in claim 13 wherein said plates are angularly disposed in a horizontal direction with reference to the axes of said axles whereby lateral movement of each axle is translated into a movement lengthwise of the frame of the corresponding end of each axle.

16. A tandem axle vehicle spring suspension adapted to be interposed between a vehicle frame and a pair of tandem axles arranged transversely of said frame and each having wheels journalled on the ends thereof, including a shear rubber spring associated with each end of at least one of said axles and each including a relatively thin rubber body having broad, generally parallel, opposite faces and a metal plate vulcanized to each of said broad faces, each of said shear rubber springs being arranged adjacent a companion axle end with said plates vertically disposed and arranged transversely of said frame, means securing one of said plates of each spring to said companion axle end and means operatively connecting the other plate of each spring to said frame, said plates being angularly disposed in a horizontal direction with reference to the axis of said one of said axles whereby lateral movement of said one of said axles is translated into an opposite movement lengthwise of said frame of each end of said one of said axles.

References Cited in the file of this patent

UNITED STATES PATENTS

| | | |
|---|---|---|
| 1,912,498 | Rayburn | June 6, 1933 |
| 2,193,567 | Pointer | Mar. 12, 1940 |
| 2,204,087 | Konetsky | June 11, 1940 |
| 2,216,715 | Ledwinka | Oct. 1, 1940 |
| 2,226,100 | Larison | Dec. 24, 1940 |
| 2,233,540 | Latshaw | Mar. 4, 1941 |
| 2,456,719 | Martin | Dec. 21, 1948 |
| 2,481,891 | Van Raden | Sept. 13, 1949 |
| 2,561,548 | Wharam | July 24, 1951 |
| 2,569,168 | Hellwig | Sept. 25, 1951 |
| 2,600,768 | Heth | June 17, 1952 |